UNITED STATES PATENT OFFICE.

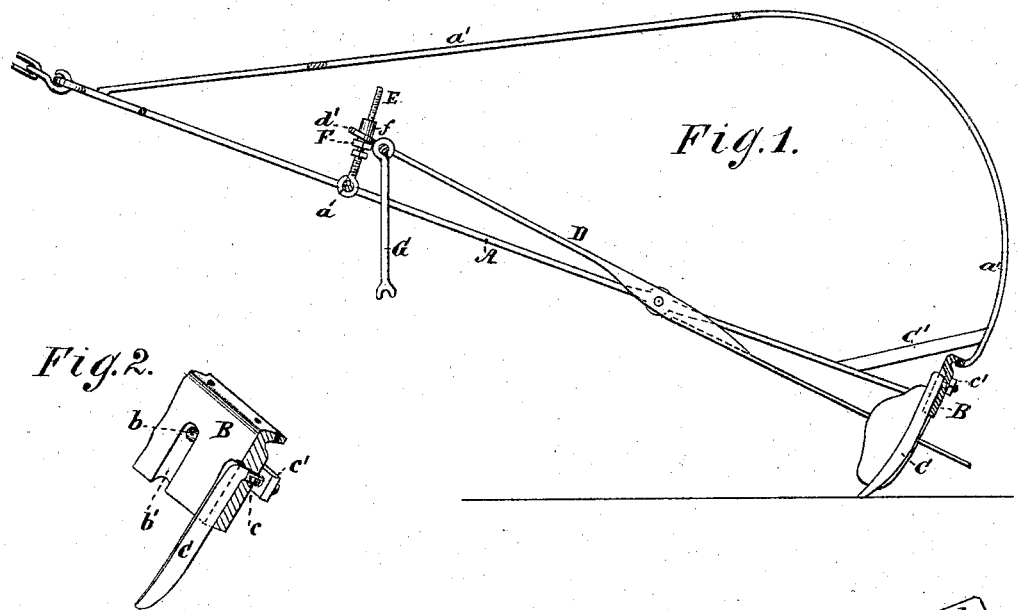
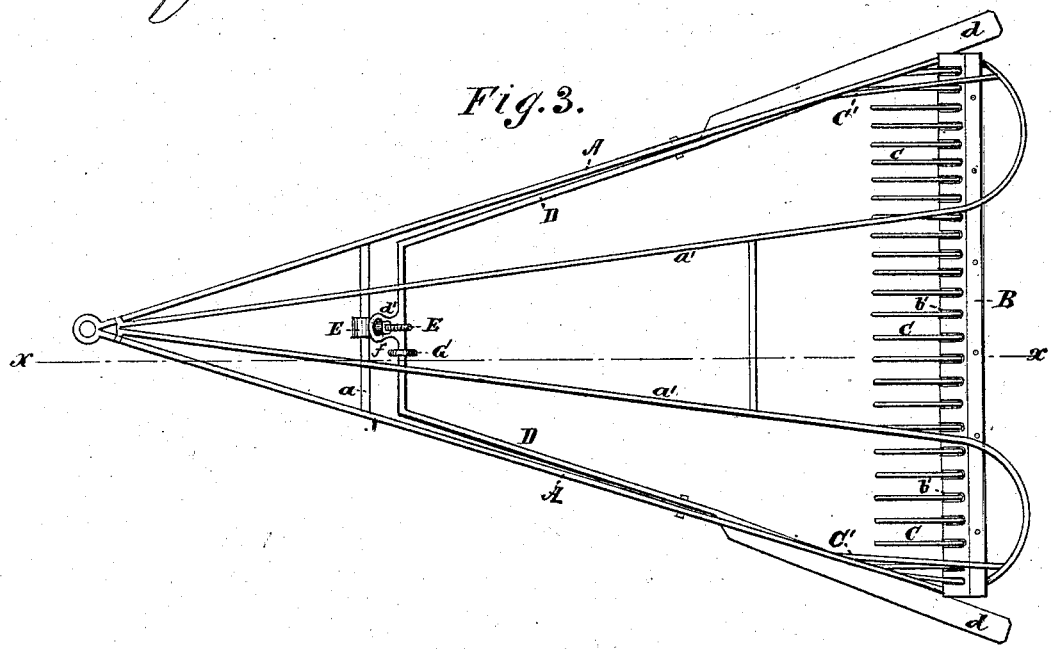

ISAAC A. KETCHAM, OF BRESLAU, NEW YORK.

IMPROVEMENT IN OYSTER-DREDGES.

Specification forming part of Letters Patent No. 138,164, dated April 22, 1873; application filed February 19, 1873.

*To all whom it may concern:*

Be it known that I, ISAAC A. KETCHAM, of Breslau, in the county of Suffolk and State of New York, have invented a new and useful Improvement in Oyster-Rakes; and I do hereby declare the following to be a full, clear, and exact description of the same, reference being had to the accompanying drawing forming part of this specification.

The invention consists in making the teeth of oyster-rakes with an end-bent shank, so that they can be readily removed and replaced. It consists also in making the rake-bar with a groove for each tooth, so that the same may be prevented from lateral movement when at work. It also consists in a diagonally-located plate over each end of rake-bar to prevent the oysters, clams, or other sunken objects from slipping off laterally when being borne backwardly into the bag or net placed to receive them. It consists also in the means employed for holding the lever-gage at any position required, and also for holding the lever while the rake is being drawn in and over the roller of the boat.

Figure 1 is a longitudinal section through line $xx$ of Fig. 3. Fig. 2 is a perspective view of the teeth and rake-bar, illustrating the mode of their connection. Fig. 3 is a top view of the rake.

In the drawing, A represents the frame to which the rake-head B is applied, detachably or otherwise, and which has the cross-bar $a$ and the superincumbent wire frame $a'$ $a'$. C represents one of the rake-teeth, which are constructed with end-bent shanks $c$ that pass through the holes $b$ of rake-head, and are clamped thereto by a nut, $c'$, which works on the threaded ends. I may, however, have a slot near the ends of these shanks to receive wedges, or I may fasten by any well-known equivalent for these. The advantage of making these teeth detachable is that they can thus be always tempered separately, in a more workmanlike manner, and more readily replaced when broken or injured, or to make the rake coarse or fine. They can also be made much thinner and of less metal in consequence of the better tempering. In order to hold these loose teeth firmly to the rake-bar, and without the possibility of lateral movement, the said rake is provided with a series of grooves, $b'$, furnishing a seat for each tooth. C' C' are diagonally-placed plates fastened to frame A and wire frame $a'$ to avoid lateral slipping of the oysters, clams, or other objects as they pass over into the bag. D is the lever-gage, whose flattened ends $d$ $d$ rest upon the ground, and, by their relative position to the teeth, graduate the depth to which the latter can sink in the soil. In order to hold the lever at any suitable point of adjustment I make the eye or loop $d'$, and provide a screw, E, which passes therethrough, and is fastened to the cross-bar $a$ of frame. On the screw is a stop-nut, F, that has the long tubular shank $f$, around which works the loop $d'$, and is thereby prevented from wearing and injuring the threads of the screw E. G is a bar, looped at one end so as to play loosely on lever-gage D, and bifurcated at the other end so as to embrace the bar $a$ when it is desired to remove the rake or dredge from the water and take it over the roller and into the boat.

Having thus described my invention, what I claim as new, and desire to secure by Letters Patent, is—

1. The tooth C of an oyster-rake, provided with an end-bent shank, $c$, detachably fastened to the rake-bar, as and for the purpose described.

2. The rake-head B having the grooved seats $b'$ for reception of the teeth, as and for the purpose set forth.

3. The plates C' C', arranged over and in front of the rake, and attached to frame A $a'$, as and for the purpose specified.

4. The means described for spacing the distance between the bar $a$ and lever-gage D, and consequently the depth to which the teeth may sink into the soil, consisting of the loop $d'$, screw E, and tubular-shanked stop-nut F $f$, arranged as described.

5. The bar G, hung loosely on frame A from one end and provided with a bifurcation at the other to embrace rod $a$, as and for the purpose set forth.

ISAAC A. KETCHAM.

Witnesses:
 THOS. D. D. OURAND,
 CHAS. A. PETTIT.